United States Patent
Kelly et al.

(10) Patent No.: US 9,362,817 B2
(45) Date of Patent: *Jun. 7, 2016

(54) POWER FACTOR CORRECTION

(75) Inventors: Jamie Kelly, North Shields Tyne & Wear (GB); Deepak Makwana, Newcastle Upon Tyne (GB); Kevin McDermott, Heaton Newcastle (GB); Paul Dalby, Middlesbrough Cleveland (GB); Wayne Bell, Broompark Durham (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 35 days.

This patent is subject to a terminal disclaimer.

(21) Appl. No.: 14/114,217

(22) PCT Filed: Apr. 27, 2012

(86) PCT No.: PCT/EP2012/057725
§ 371 (c)(1),
(2), (4) Date: Oct. 27, 2013

(87) PCT Pub. No.: WO2012/146698
PCT Pub. Date: Nov. 1, 2012

(65) Prior Publication Data
US 2014/0049993 A1    Feb. 20, 2014

(30) Foreign Application Priority Data

Apr. 28, 2011 (GB) .................................. 1107174.3
May 13, 2011 (GB) .................................. 1108035.5

(51) Int. Cl.
*H02M 1/12* (2006.01)
*H02M 1/42* (2007.01)
*H02M 1/00* (2006.01)

(52) U.S. Cl.
CPC .... *H02M 1/4225* (2013.01); *H02M 2001/0003* (2013.01); *Y02B 70/126* (2013.01)

(58) Field of Classification Search
CPC ..... H02M 1/4225; H02M 3/157; H02M 1/12; H05B 41/282; G05F 1/70
USPC ......... 323/207, 212, 222, 272, 277, 282–290, 323/205; 363/46, 47, 59, 82, 89, 39–41
See application file for complete search history.

(56) References Cited

U.S. PATENT DOCUMENTS

| 6,304,465 B1 * | 10/2001 | Takita ................. H02M 1/4225 323/222 |
| 6,657,417 B1 * | 12/2003 | Hwang ..................... G05F 1/70 323/207 |

(Continued)

FOREIGN PATENT DOCUMENTS

| DE | 102004025597 A1 | 12/2005 |
| EP | 1603219 | * 12/2005 |

(Continued)

*Primary Examiner* — Rajnikant Patel
(74) *Attorney, Agent, or Firm* — Volpe and Koenig, P.C.

(57) ABSTRACT

A power factor correction circuit includes an inductor L1, a diode D1, a switch Q3 and a controller 24. An input voltage $V_{in}$ is applied to the inductor L1 which is cyclically discharged through the diode D1 by the operation of the switch Q3. The switch Q3 is controlled by the controller 24 which varies the on period of the switch Q3, during which the inductor is charged, for adjusting an output voltage $V_{bus}$ towards a target value $V_{bus\_target}$. The method includes obtaining an indication of the inductor L1 reaching a discharged state in response to the switch being in an off state. The controller 24 monitors at least one of the switch on period $T_{on}$ and the switch off period $T_{off}$ to identify when the input voltage $V_{in}$ is an alternating voltage AC input, and when it is likely to be a non-alternating voltage DC input. When a non alternating voltage is detected, steps may be taken to reduce interference.

17 Claims, 6 Drawing Sheets

(56) References Cited

U.S. PATENT DOCUMENTS

| | | | |
|---|---|---|---|
| 6,946,819 B2 * | 9/2005 | Fagnani et al. ............... | 323/207 |
| 7,397,678 B2 * | 7/2008 | Frank .................. | H02M 1/4225 323/207 |
| 9,041,379 B2 * | 5/2015 | Lyons ................ | H05B 33/0815 323/288 |
| 2012/0133285 A1 | 5/2012 | Kelly | |

FOREIGN PATENT DOCUMENTS

| | | |
|---|---|---|
| WO | 2011/009717 A2 | 1/2011 |
| WO | 2011/009733 A1 | 1/2011 |

* cited by examiner

POWER FACTOR CORRECTION

TECHNICAL FIELD

The present invention relates to a method and circuit for performing power factor correction.

BACKGROUND TO THE INVENTION

The power factor of an AC electric power system is the ratio of the real power flowing to the load to the apparent power in the circuit and is a dimensionless number between 0 and 1. It is desirable for the power factor to be as close to 1 as possible.

The power factor correction (PFC) circuits are often used within power supply applications in which AC/DC rectification is performed. Such rectifying arrangements typically comprise a full wave voltage rectifier (usually a diode bridge) and an output capacitor to provide regulation of the output waveform in at the output bus. This type of rectifying arrangement only draws current from the AC supply when the full wave rectifier voltage is greater than the voltage across the output capacitor. This is unsatisfactory as it gives an inefficient current profile of the input AC current consisting of separated narrow pulses of current having large peak values. The high harmonic content of this current profile gives a low power factor (typically 0.5) of the rectifying arrangement as a whole.

The power factor is improved by applying a PFC circuit between the diode bridge and the output capacitor. Such a PFC circuit essentially comprises an inductor followed by a diode, with a switch (typically an FET) connected between the inductor and the diode to ground.

By rapidly switching the switch on and off, the inductor is repeatedly first connected directly to ground via the switch and then connected to the output capacitor (via the diode) when the switch is turned off. When the switch is on the current flow through the inductor increases and, during the subsequent time period in which the switch is off, the current decreases, effectively pushing current through the diode to charge the output capacitor. By adjusting the on and off times of the switch by a suitable power factor control circuit the output voltage may be adjusted to a fixed, desired value (target value), although the output voltage is always higher than the input voltage because of the action of the diode in conjunction with the "boosting" action of the inductor.

FIG. 1 shows such a known power factor correction circuit 125, based on a boost converter topology. A smoothing capacitor 104 filters an input voltage (typically from a bridge rectifier) that is measured by a voltage divider 105, 106. The input voltage is usually a rectified AC input voltage, e.g. mains voltage. The input voltage is applied to an inductor 101. A secondary winding 102 detects the zero crossings of the current through the inductor 101. A current sensing resistor (shunt) 108 connected to the source of a switch 107 (typically a FET) allows the detection of the inductor peak current to determine a possible over-current condition. In parallel with an output capacitor 111, a second voltage divider 109, 110 is arranged to measure the DC output voltage and a surge condition, for example, due to by load variations.

The above four measurements that take place in the power factor correction circuit 125 by means of four measuring inputs 117, 118, 119 and 120 of an electronic control circuit 116. The control circuit 116 additionally has an output 121, through which the switch 107 is controlled. The electronic control circuit 116 is typically arranged as an ASIC. A total of five pins are used for power factor correction.

In this power factor correction circuit 125 the input voltage is fed to the inductor 101. The inductor 101 is by means of the switch 107 either loaded or unloaded. The on-time of the switch 107 and thus the load time of the inductor 101 is controlled based upon a comparison of the measured DC output voltage $V_{bus}$ with a fixed reference voltage. The switch 107 is turned off to discharge the inductor 101 until the current through the inductor 101 has fallen to zero (as detected by the secondary winding 102). The switch 107 is cycled with a much higher frequency (at least 10 kHz) than the frequency of the mains voltage (typically 50 Hz) and the frequency of rectified AC input voltage (typically 100 Hz)

The measuring pin 117 may be used to detect when the voltage changes from its usual AC input to DC (such as from a battery).

To reduce costs power factor correction arrangements which include an electronic control circuit with only a single pin for receiving measurement inputs are know for example from DE 102004025597 and WO 2011009717.

As mentioned above, typically the input voltage to the PFC circuit is an AC mains supply having an alternating voltage. Other types of alternating voltage supply are also possible. Further, it is possible that the input voltage to the PFC circuit will be a non-alternating, substantially constant voltage, corresponding to a DC supply from a battery, for example.

By way of example, if the PFC circuit is for supplying power to a lamp of a lighting system, in normal operation the lamp will be powered by the AC mains supply, applied to the lamp via the PFC circuit. The lighting system may include means for detecting when mains power ceases (for example, when a power cut occurs), and for then activating a back-up battery DC supply in order to provide emergency lighting, which may be of a lower intensity than the normal lighting.

It is an object of an embodiment of the present invention to provide a method and a PFC circuit that is capable of detecting whether the input to the PFC circuit changes between an alternating voltage input and a non-alternating voltage input even when no direct monitoring of the input voltage is possible (such as in a single input pin electronic control circuit). This is particularly advantageous for detecting when the AC mains supply to a lighting system is cut off and is replaced by a back-up battery DC power supply. It is advantageous to detect when power supply is a DC power supply, for example so that the lamp may be switched at a frequency that is ramped in order to prevent the concentration of any electric interference at a particular frequency.

Whilst the present invention is particularly advantageous for driving lamps, it should, however, be appreciated that the invention is applicable to PFC circuits that power devices other than lamps.

SUMMARY OF THE INVENTION

According to a first aspect of the present invention, there is provided a method of power factor correction in which an input voltage is applied to an inductor which is cyclically discharged through a diode by the operation of a switch, the switch being controlled by a controller which varies the on period of the switch, during which the inductor is charged, for adjusting an output voltage towards a target value, the method including obtaining an indication of the inductor reaching a discharged state in response to the switch being in an off state, characterised by the controller monitoring at least one of the switch on period and the switch off period to identify whether the input voltage is an alternating voltage.

In the embodiment to be described, the controller monitors the switch off period to identify whether the input voltage is an alternating voltage. In an alternative arrangement the controller may monitor the switch on period to identify whether the input voltage is an alternating voltage. In a further alternative embodiment the controller may monitor the ratio of the switch on period to the switch off period.

The controller may determine that the input voltage is an alternating voltage if the switch off period passes a threshold within a predetermined time period. More preferably, the controller determines that the input voltage is an alternating voltage if the switch off period exceeds an upper threshold within a predetermined time period or if the switch off period is less than a lower threshold within a predetermined time period. These two predetermined time periods may be the same or different but are preferably the same.

If the switch off period does not exceed an upper threshold within the predetermined time period and if the switch off period does not fall below a lower threshold within the predetermined time period, then the input voltage is considered to be non-alternating. An example of a non-alternating input voltage is the DC power from a battery. Such a non-alternating voltage may still vary over time, for example as the battery providing power is depleted, but any variations are much less than an alternating input voltage.

The controller may monitor the ratio of the switch off period to the switch on period to identify whether the input voltage is an alternating voltage. In this regard, the controller may determine that the input voltage is an alternating voltage if the ratio of the switch off period to the switch on period passes a threshold within a predetermined time period, and preferably the controller determines that the input voltage is an alternating voltage if the ratio of the switch off period to the switch on period exceeds an upper threshold within a predetermined time period or if the ratio of the switch off period to the switch on period is less than a lower threshold within a predetermined time period. These two predetermined time periods may be the same or different but are preferably the same.

In the embodiment, when the controller identifies that the input voltage is a non-alternating voltage, it activates means operable to reduce electrical interference.

In the embodiment the controller controls the switch using information from a single input. This single input may provide the indication of the voltage across the switch. In the embodiment the switch is a field effect transistor (FET), and the single input is an indication of a voltage across the drain to source of the FET.

In the embodiment the controller is an ASIC, and includes the two pins for performing power factor correction, one of which receives the single input mentioned above, and the other of which controls the switch by controlling at what times a voltage is applied to the gate of the FET.

According to a second aspect of the present invention, there is provided a power factor correction circuit including an inductor, a diode, a switch and a controller, operable such that an input voltage applied to the inductor is cyclically discharged through the diode by the operation of the switch, the switch being controlled by the controller which is operable to vary the on period of the switch, during which the inductor is charged, for adjusting an output voltage towards a target value, the controller being responsive to an indication of the inductor reaching a discharged state when the switch is in an off state, characterised in that the controller is operable to monitor at least one of the switch on period and the switch off period to identify whether the input voltage is an alternating voltage.

As another aspect of the present invention, there is provided an electronic driver for a lightsource comprising a power factor correction circuit according to this invention. The electronic driver for the lightsource may include a driver circuit to power the lightsource which is fed by the output of the power factor control circuit. The lightsource may be, for example a gas discharge lamp, LED or OLED. The driver circuit to power the lightsource may be a resonant half bridge, a flyback or a buck converter.

BRIEF DESCRIPTION OF THE DRAWINGS

For a better understanding of the present invention an embodiment will now be described by way of example, with reference to the accompanying drawings, in which.

DETAILED DESCRIPTION OF EMBODIMENT OF THE INVENTION

Figure 1:
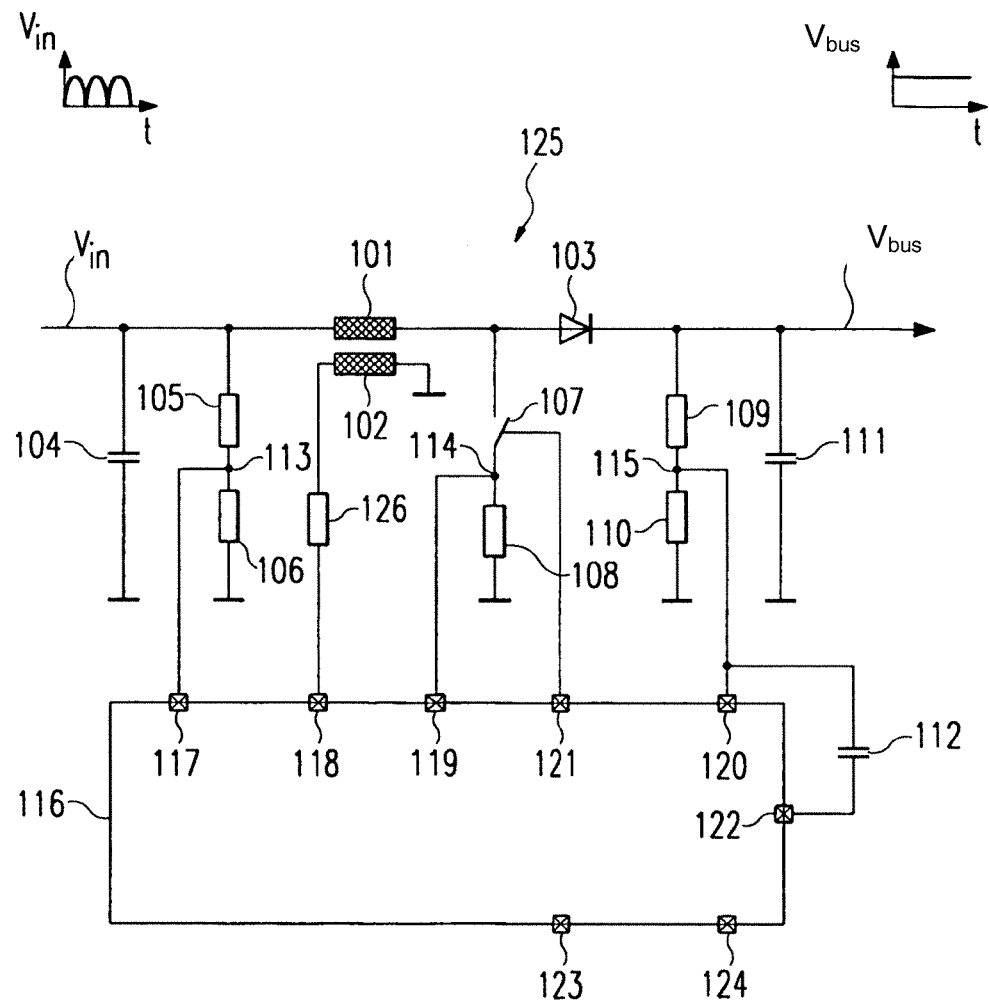
FIG. 1 shows a prior art power factor correction circuit.
Figure 2:
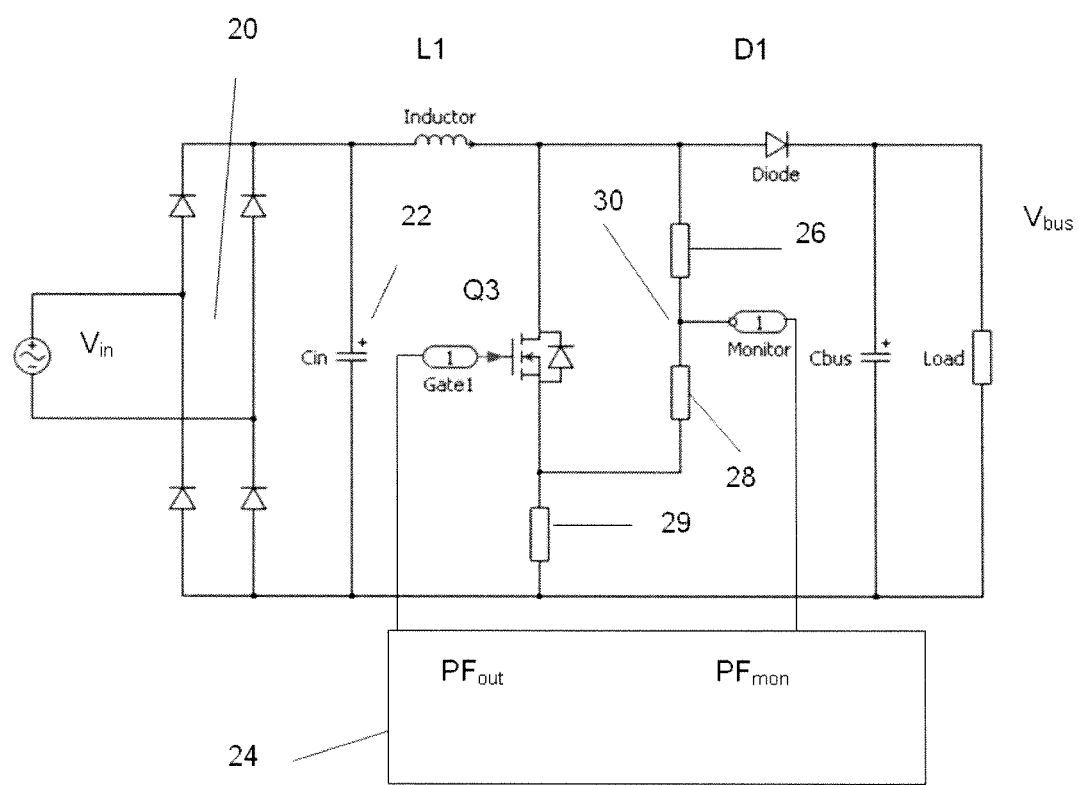
FIG. 2 shows a power factor correction circuit in accordance with the embodiment of the present invention, including an electronic control circuit.

FIG. 2 shows a power factor correction circuit in accordance with an embodiment of the present invention. An input voltage is applied to a bridge rectifier 20. The input voltage may be a sinusoidal input voltage $V_{in}$ (for example 230v AC mains voltage) or a non-alternating (e.g. substantially constant) DC input voltage, such as from a battery. For an AC input the resultant voltage at the input capacitor 22 comprises a succession of half sine waves of the same polarity. The capacitor 22 filters out unwanted high frequency noise.

The input voltage is applied to inductor L1. A diode D1 is connected between the inductor L1 and the output bus at which the output voltage $V_{bus}$ is provided across output capacitor Cbus.

A switch (in this embodiment a FET) Q3 has its drain connected between the inductor L1 and the diode D1 and its source connected to ground. The gate of the switch Q3 is controlled by the single PFC output $PF_{on}$, of electronic control circuit 24, which in the embodiment is an ASIC. Resistors 26 and 28 are connected in series to form a voltage divider arrangement which is coupled in parallel between the source of the switch Q3 and to a point between the drain of the switch Q3 and the diode D1. A further resistor 29 is connected in series between the source of the switch Q3 and ground and has a much smaller resistance than the resistance of resistors 26 and 28. The voltage at measuring point 30 between the resistors 26 and 28 is monitored by the single power factor control input pin $PF_{mon}$ of the electronic control circuit 24.

Briefly, the normal operation of this circuit is as follows. The electronic control circuit 24 output $PF_{out}$ selects an appropriate on time duration $T_{on}$ for the switch Q3 and applies a voltage to the gate of the switch Q3 to close the switch during period $T_{on}$. The current in the inductor L1 increases during the period $T_{on}$. When the period $T_{on}$ ends, the output $PF_{out}$ of the electronic control circuit 24 controls the gate of the switch Q3 to open the switch, starting the period $T_{off}$. During the time period $T_{off}$ the energy stored in the inductor L1 during the period $T_{on}$ is gradually discharged and is pushed through the diode D1 to charge the output capacitor Cbus. By adjusting the $T_{on}$ and $T_{off}$ periods the output voltage $V_{bus}$ can be adjusted, but is always higher than the input voltage because of the action of the diode in conjunction with the boosting action of the inductor L1. The switch is cycled at a frequency (e.g. 10 kHz) much higher than the frequency of the input mains voltage (e.g. 50 or 60 Hz). Conventionally, the power factor control circuit would be operated to maintain the output voltage $V_{bus}$ at the bus at a constant target value, $V_{bus\_target}$.

In normal operation the power factor control circuit operates in a continuous conduction mode (CCM) with demagnetization of the inductor, and immediate switch on of the switch Q3 as soon as the demagnetization has been detected. In the CCM the period $T_{off}$ should end as soon as the current flowing through the inductor falls to substantially zero. As mentioned above, conventionally, the zero crossing of the current from the inductor is measured using a secondary winding provided in relation to the inductor L1. However, providing such a secondary winding increases the cost of the power factor correction circuit. Further, for the secondary winding to be monitored by the electronic control circuit 24, an additional input pin to receive the measurement signal from the secondary winding would be required, which would add to the size, complexity and cost of the electronic control circuit.

According to the present embodiment the electronic control circuit 24 estimates whether the current from the inductor L1 is zero using the signal applied to the $PF_{mon}$ input of the electronic control circuit 24.

When the switch Q3 is open during time period $T_{off}$ the input $PF_{mon}$ to the electronic control circuit 24 from measurement point 30 provides an indication of the voltage across the switch Q3. This voltage corresponds substantially to the output bus voltage $V_{bus}$ from the beginning of the time period $T_{off}$ until the inductor discharge current reaches zero. When the inductor current reaches zero, the measured voltage by $PF_{mon}$ reduces, and then represents the current in Q3 during time period $T_{on}$.

Figure 3:
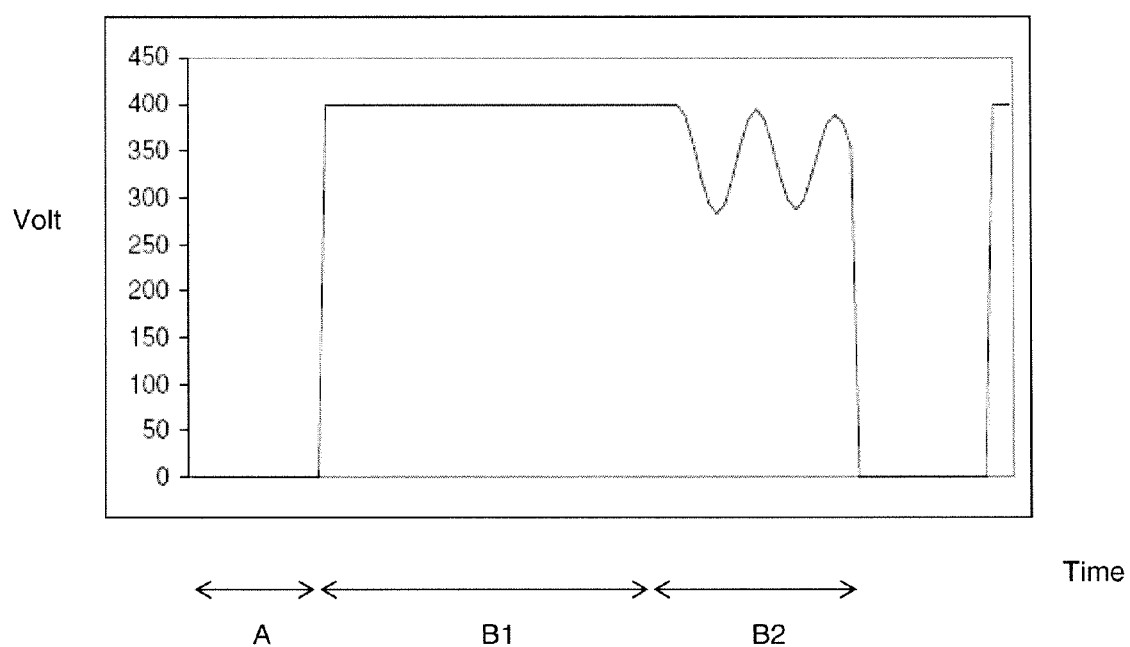
FIG. 3 shows the voltage across the switch of the circuit of FIG. 2 This signal combined with the current in Q3 appears at pin $PF_{mon}$ of the electronic control circuit.

FIG. 3 shows a waveform typical of the voltage across the switch Q3, which is monitored by $PF_{mon}$.

Time period A corresponds to $T_{on}$, when switch Q3 is closed and the inductor L1 is charged. During this period A the voltage at $PF_{mon}$ reflects the current in Q3. When the switch is then opened, time period $T_{off}$ begins, as represented by time periods B1 and B2 in FIG. 3. During time period B1 the inductor L1 is steadily discharged and the current flowing through the diode D1 gradually deceases from an initial relatively high current. During time period B1 the voltage $PF_{mon}$ corresponds substantially to the output voltage $V_{bus}$ (400 volts in this example). However, as the current from the inductor L1 reaches zero, at the beginning of time period B2, the voltage $PF_{mon}$ reduces.

A threshold of the $PF_{mon}$ voltage is set at which the electronic control circuit 24 determines that the inductor current has reached zero. For example, when the voltage $PF_{mon}$ falls to a zero current indicator value it is determined by the electronic control circuit 24 that the zero inductor current point has been reached. The zero current indicator value may be 90% of the voltage measured at $PF_{mon}$ during the time period B1 immediately preceding the current time period B2. The voltage may be measured at the beginning of period B1, after a predetermined delay from the start of time period B1, or by detecting the voltage a plurality of times during time period B1 and averaging (e.g. calculating the arithmetical mean of) the voltages, or using the highest or lowest value of the plurality of voltages. In response to the determination that the voltage has reached the zero current indicator value, the electronic control circuit 24 closes the switch Q3, thereby ending the time period $T_{off}$ and beginning the next time period $T_{on}$.

The electronic control circuit 24 calculates the output voltage $V_{bus}$ indicated by $PF_{mon}$ during time period B1 and compares this to a target output voltage $V_{bus\_target}$. If the indicated output voltage is less than the target value $V_{bus\_target}$, then the time period $T_{on}$ is increased. Conversely, if the indicated output voltage is greater than the target output voltage, then the time period $T_{on}$ is decreased.

The effect of these changes to the time period $T_{on}$ is to alter $T_{off}$ by virtue of the operation of the PFC circuit. If the time period $T_{on}$ is increased, the time period $T_{off}$ will be decreased. Conversely, if the time period $T_{on}$ is decreased, the time period $T_{off}$ will be increased.

As the input voltage $V_{in}$ increases relative to the output voltage $V_{bus}$, the electronic control circuit 24 increases the ratio of $T_{off}:T_{on}$ the decrease in the period $T_{on}$ reducing the voltage boost in order to maintain the output voltage $V_{bus}$ constant. Likewise, as the input voltage $V_{in}$ decreases relative to the output voltage $V_{bus}$, the electronic control circuit 24 decreases the ratio of $T_{off}:T_{on}$—the increases in the period $T_{on}$ increasing the voltage boost in order to maintain the output voltage $V_{bus}$ constant. The ratio $T_{off}:T_{on}$ should therefore give an indication of the input mains voltage $V_{in}$.

The electronic control circuit 24 may only accept a sample at $PF_{mon}$ as a valid indication of a zero crossing if the zero crossing is indicated not to have occurred early, for example, within 2-3 μs of the switch Q3 switching off. If the zero crossing is considered invalid, then the electronic control circuit 24 will not adjust $T_{on}$ but will use the previous valid value until a valid zero crossing is detected.

The electronic control circuit 24 may include a timer that times the duration of the $T_{off}$ period. When the $T_{off}$ period exceeds a maximum value $T_{off\_max}$ (for example, 800 ms), the electronic control circuit 24 may then automatically close the switch Q3, thereby ending the time period $T_{off}$ and beginning the next time period $T_{on}$, even though no zero inductor current crossing has been detected. Whilst such an arrangement allows the PFC circuit to continue operating, the ratio of $T_{off}:T_{on}$ is no longer proportional to the input mains voltage $V_{in}$.

From the discussion above, it will be understood that the point at which the inductor current reaches zero is detected by measuring at $PF_{mon}$ the voltage across the drain and source of the switch Q3. The electronic control circuit 24 determines when the voltage at $PF_{mm}$ falls to below 90% of the bus voltage value $V_{bus}$ (measured at $PF_{mon}$ during period B1 in FIG. 3) as an indication that there is zero inductor current.

When an AC mains voltage $V_{in}$ is applied as the input voltage, the time period $T_{off}$ varies from low values near the rectified AC mains zero crossing to high values near the peak of the rectified AC mains by virtue of the operation of the PFC circuit. However, when the input voltage is derived from a DC source, and is substantially constant, this results in the time period $T_{off}$ having a substantially fixed value (if the PFC circuit continues to operate in the manner discussed above).

According to an important feature of the present embodiment, the presence of a substantially fixed value for the time period $T_{off}$ is used for detecting whether the input voltage $V_{in}$ is from an AC or DC supply. According to the embodiment, when the degree of variation of the time period $T_{off}$ or the ratio of $T_{off}:T_{on}$, is significantly reduced below that normally associated with an AC input voltage $V_{in}$, this is used to determine that the input voltage is a DC input.

For example, an upper threshold of $T_{off}$ may be defied as $T_{off\_high}$ and a lower threshold of $T_{off}$ may be defied as $T_{off\_low}$. These thresholds are selected such that they are passed when normal rectified AC input voltage $V_{in}$ is near its maximum and minimum value, respectively, during each cycle of the normal rectified AC input voltage $V_{in}$ (when present). When the input voltage $V_{in}$ has an intermediate value that is not near maximum or minimum value of the normal rectified AC input voltage $V_{in}$ the, the time period $T_{off}$ has an intermediate value between $T_{off\_high}$ and $T_{off\_low}$. When the time period $T_{off}$ has an intermediate value between $T_{off\_high}$ and $T_{off\_low}$ for a time period (e.g. 20 ms) which is greater that the period of one cycle of the rectified AC input voltage $V_{in}$ (10 ms), the variation of the time period $T_{off}$ is significantly reduced below that normally associated with an AC input voltage $V_{in}$, and this is used to determine that the input voltage is a DC input.

Detection of the DC input may be used to trigger action to reduce interference that occurs due to DC operation. The PFC circuit may modulate the working frequency of the PFC in DC operation in order so to "dilute" the interference spectrum of the circuit towards side bands outside the middle working frequency. This makes compliance with the electromagnetic capability regulations possible. The modulation depth may be changed (i.e. prolongation/shortening of the switch-on time period $T_{on}$ of the switch Q3 may be performed) and/or the switching frequency may be changed. In response to detection of the DC input, the controller 24 may vary $T_{on}$ in accordance with values in a look-up table to reduce noise, in the manner described in WO2006/042640. Also, the detection of the DC voltage input $V_{in}$ may be used to reduce the power supplied to the lamp on the basis that the lamp is being driven by battery power, in order to conserve the battery life.

An arrangement for detecting when the input voltage $V_{in}$ is a DC input will now be described in detail in relation to the flow chart of FIGS. 4A and 4B.

At step A a counter is reset to zero.

Prior to step B the switch Q3 is opened, and time period B1 ($T_{off}$) begins. At step B the voltage at pin $PF_{mon}$ is sampled to obtain an indication of the bus voltage $V_{bus}$, this value being referred to as "Sample $V_{bus}$".

At step C the zero indicator current threshold at which the voltage at $PF_{mon}$ indicates a zero crossing event is calculated (90% of the detected output bus voltage $V_{bus}$ during time period B1 in this example).

When the voltage at pin $PF_{mon}$ falls below the zero indicator current threshold, it is determined that the zero current stage has been reached.

At step D the control logic calculates a new time period $T_{on}$ based on the measurements made at pin $PF_{mon}$. For example, the control logic may determine the difference between the indicated bus voltage $V_{bus}$ at pin $PF_{mon}$ during time period B1 and the target bus voltage $V_{bus\_target}$. If the indicated bus voltage is less than the target bus voltage $V_{bus\_target}$, then the new time period $T_{on}$ will be increased over the previous time period $T_{on}$. Conversely, if the indicated bus voltage is greater than the target bus voltage $V_{bus\_target}$, then the new time period $T_{on}$ may be decreased compared with the previous time period $T_{on}$.

At step E, the time period $T_{off}$ ends and the control logic signals at pin $PF_{out}$ to switch the switch Q3 on, to begin time period $T_{on}$. This occurs either when a zero crossing is detected (whether a normal zero crossing or an early zero crossing at step C), or when $T_{off}=T_{off\_max}$ (maximum value $T_{off\_max}$ has been reached).

At step F, when the time period $T_{on}$ (as determined by step D) ends, the control logic signals at pin $PF_{out}$ to switch the switch Q3 off, in order to begin the next time period $T_{off}$.

At step G the counter that was set to zero at step A is incremented at a fixed rate.

At step H it is determined whether the condition $T_{off} < T_{off\_low}$ is satisfied. If this condition is true, it is an indication that the input mains voltage $V_{in}$ is at a low value in the cycle.

At step H if the condition is true, then at step I the counter is reset to zero.

If the condition at step H is not true, then at step J it is determined whether the condition $T_{off} > T_{off\_high}$ is satisfied. If this condition is true, it is an indication that the input mains voltage $V_{in}$ is at a high value in the cycle.

If at step J the condition is true, then at step O the counter is reset to zero.

Step L is performed following step I, J and K. At step L it is determined if the counter exceeds a limit value. In this example, the limit value is a counter value that indicates that 20 milliseconds has expired since the last counter reset (either at step A, step I or step K). Other limit values may be used, in dependence upon the circumstances.

If at step L it is determined that the counter has exceeded the limit value, then at step M it is determined that the input voltage $V_{in}$ is a DC voltage and the condition "DC_mains" is true. The procedure than returns to step B.

If at step L it is determined that the counter is less than or equal to limit value, the input voltage $V_{in}$ is considered to be an AC voltage and the procedure returns to step B.

The incrementing of the counter at step G may be performed such that the incrementing stops once the counting has exceeded the limit.

Figure 4A:
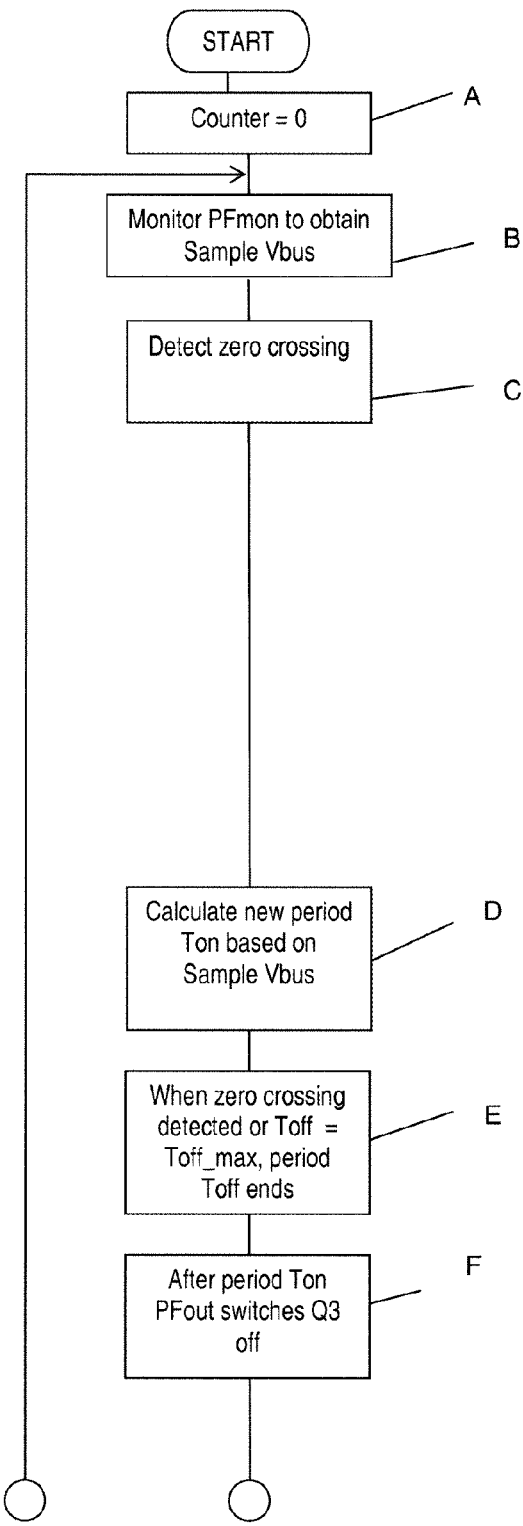
FIGS. 4A and 4B are a flowchart showing the steps performed in accordance with the power factor correction procedure of the embodiment of the present invention in order to detect a DC input voltage.
Figure 4B:
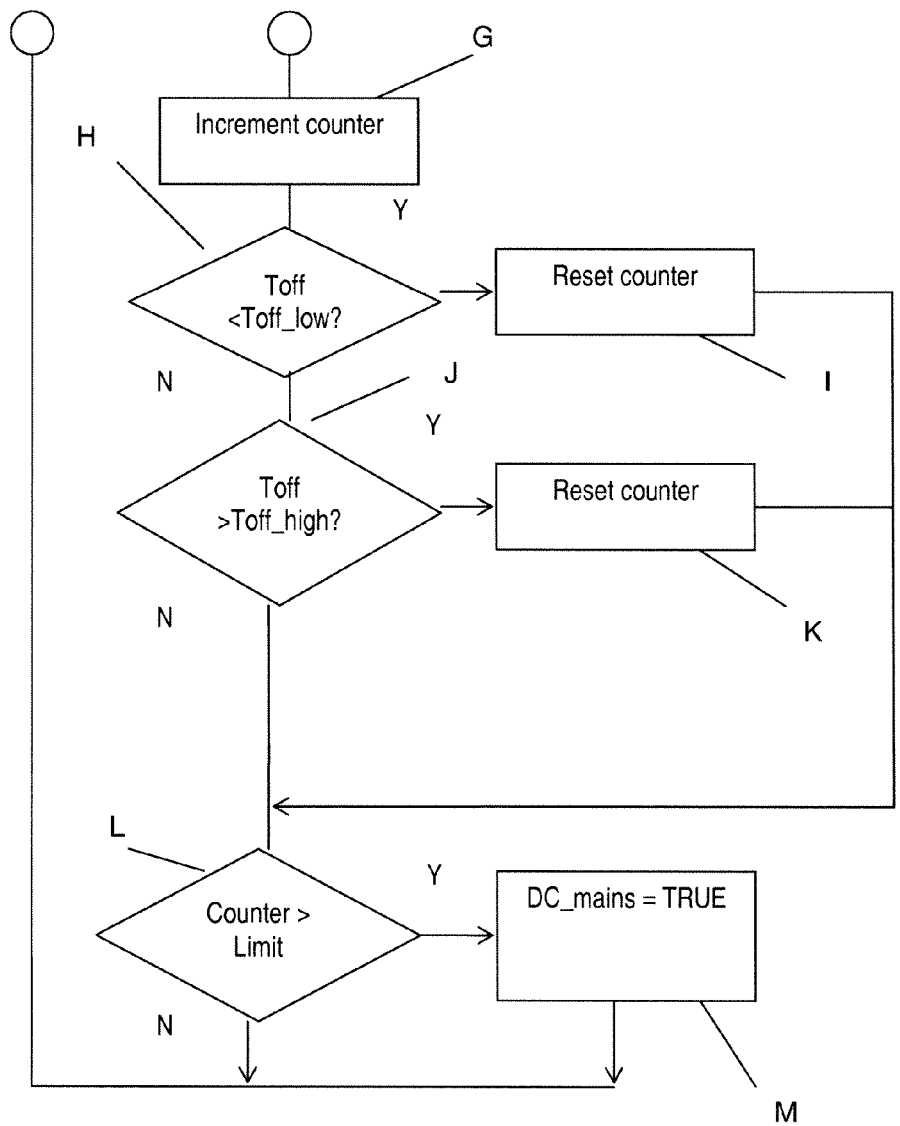
Figure 5:
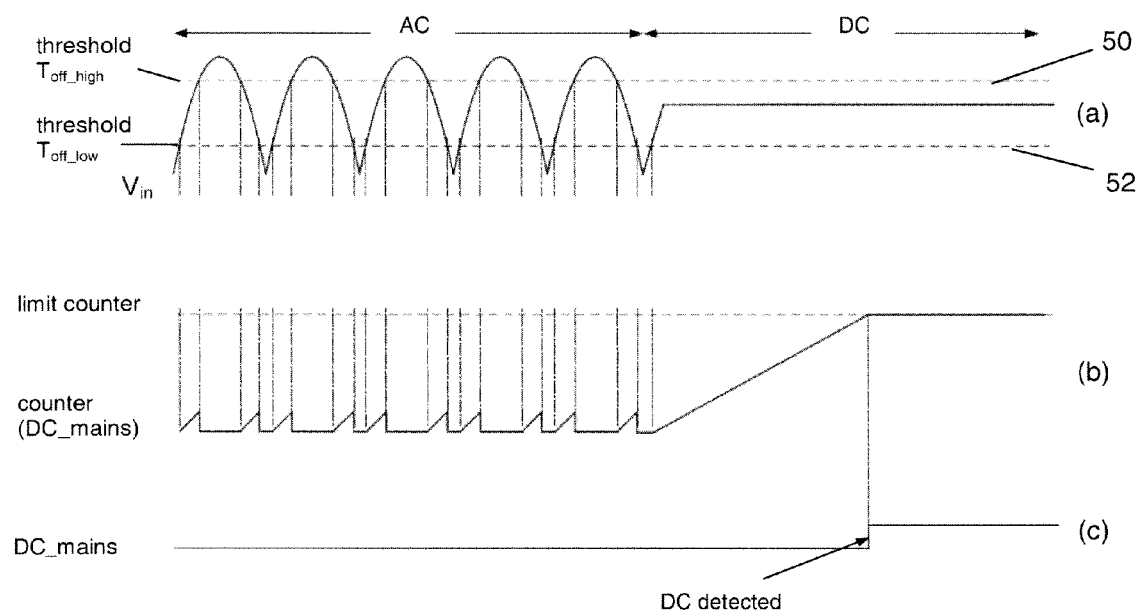
FIG. 5 is a timing diagram which shows how $T_{off}$ thresholds are passed as the input voltage varies, and how a DC input voltage is detected.

The effect of the flowchart of FIG. 4 can be seen by consulting the waveform timing diagrams of FIG. 5.

Waveform (a) shows the voltage of the rectified input voltage $V_{in}$ over a period of time. Above the dashed line 50 indicates when $T_{off}$ exceeds the $T_{off\_high}$ threshold. Below the dashed line 52 indicates when $T_{off}$ is below the $T_{off\_low}$ threshold.

Waveform (b) shows the counter value.

Waveform (c) shows when DC_mains is true.

According to the procedure of the flow chart of FIGS. 4A and 4B, the counter increments at a fixed rate. If the time period $T_{off}$ reduces below a first threshold $T_{off\_low}$ or if the time period $T_{off}$ exceeds a second threshold $T_{off\_high}$, the counter is reset to zero (at step I or step K). In this way, when the input voltage is from an AC supply, the counter will be reset periodically due to the pulsating nature of the input voltage. Provided that the counter is reset before it counts to a limit/maximum value (corresponding to 20 ms in this embodiment), then the control circuit 24 considers the input voltage $V_{in}$ to be an AC input. However, if the input voltage $V_{in}$ switches to a DC input (for example, following a power cut), then the input voltage ceases to pulsate and becomes substantially constant, as shown in FIG. 5. This results in the time period $T_{off}$ remaining at a substantially fixed value, that is in between the first threshold $T_{off\_low}$ and a second threshold $T_{off\_high}$. Therefore, when a DC input voltage $V_{in}$ is applied, neither the first threshold nor the second threshold is passed, and the counter is not reset. After the time period of 20 ms, the fixed rate incrementing of the counter (at step G) results in the counter exceeding the maximum value (corresponding to 20 ms) and the condition DC_mains being true (at step M). The presence of this condition being true is used by the control circuit to determine that the input voltage $V_{in}$ is now a DC input, so that appropriate action can be taken to reduce interference, as discussed above.

The arrangement may also determine when the input voltage $V_{in}$ changes from a DC input to an AC input, in order that appropriate action can be taken at that time, such as to stop the interference-reducing measures being performed.

The invention claimed is:

1. A method of power factor correction in which an input voltage (Vin) is applied, through a rectifier, to an inductor (L1) which is cyclically discharged through a diode (D1) by operation of a switch (Q3), the switch (Q3) being controlled by a controller (24) which varies the on period of the switch (Q3), during which the inductor is charged, for adjusting an output voltage (Vbus) towards a target value (Vbus_target), the method comprising obtaining an indication of the inductor (L1) reaching a discharged state in response to the switch being in an off state, the controller (24) monitoring at least one of a switch on period (Ton) or a switch off period (Toff) to identify whether the input voltage (Vin) is an alternating voltage.

2. The method of claim 1, wherein the controller (24) monitors the switch off period (Toff) to identify whether the input voltage (Vin) is an alternating voltage.

3. The method of claim 2, wherein the controller determines that the input voltage (Vin) is an alternating voltage if the switch off period (Toff) passes a threshold within a predetermined time period.

4. The method of claim 2, wherein the controller determines that the input voltage (Vin) is an alternating voltage if the switch off period (Toff) exceeds an upper threshold (Toff_high) within a predetermined time period or if the switch off period (Toff) is less than a lower threshold (Toff_low) within a predetermined time period.

5. The method of claim 1, wherein the controller (24) monitors a ratio of the switch off period (Toff) to the switch on period (Ton) to identify whether the input voltage (Vin) is an alternating voltage.

6. The method of claim 5, wherein the controller determines that the input voltage (Vin) is an alternating voltage if the ratio of the switch off period (Toff) to the switch on period (Ton) passes a threshold within a predetermined time period.

7. The method of claim 5, wherein the controller determines that the input voltage (Vin) is an alternating voltage if the ratio of the switch off period (Toff) to the switch on period (Ton) exceeds an upper threshold (Toff_high) within a predetermined time period or if the ratio of the switch off period (Toff) to the switch on period (Ton) is less than a lower threshold (Toff_low) within a predetermined time period.

8. The method of claim 1, wherein when the controller (24) identifies that the input voltage (Vin) is a non-alternating voltage, the controller (24) activates a device operable to reduce electrical interference.

9. A power factor correction circuit comprising an inductor (L1), a diode (D1), a switch (Q3) and a controller (24), operable such that an input voltage (Vin) applied, via a rectifier, to the inductor (L1) is cyclically discharged through the diode (D1) by an operation of the switch (Q3), the switch (Q3) being controlled by the controller (24) which is operable to vary an on period of the switch (Q3), during which the inductor is charged, for adjusting an output voltage (Vbus) towards a target value (Vbus_target), the controller being responsive to an indication of the inductor (L1) reaching a discharged state when the switch is in an off state, the controller (24) is operable to monitor at least one of a switch on period (Ton) or a switch off period (Toff) to identify whether the input voltage (Vin) is an alternating voltage.

10. The circuit of claim 9, wherein the controller (24) is operable to monitor the switch off period (Toff) to identify whether the input voltage (Vin) is an alternating voltage.

11. The circuit of claim 10, wherein the controller is operable to determine that the input voltage (Vin) is an alternating voltage if the switch off period (Toff) passes a threshold within a predetermined time period.

12. The circuit of claim 10, wherein the controller is operable to determine that the input voltage (Vin) is an alternating voltage if the switch off period (Toff) exceeds an upper threshold (Toff_high) within a predetermined time period or if the switch off period (Toff) is less than a lower threshold (Toff_low) within a predetermined time period.

13. The circuit of claim 9, wherein the controller (24) is operable to monitor a ratio of the switch off period (Toff) to the switch on period (Ton) to identify whether the input voltage (Vin) is an alternating voltage.

14. The circuit of claim 13, wherein the controller is operable to determine that the input voltage (Vin) is an alternating voltage if the ratio of the switch off period (Toff) to the switch on period (Ton) passes a threshold within a predetermined time period.

15. The circuit of claim 13, wherein the controller is operable to determine that the input voltage (Vin) is an alternating voltage if the ratio of the switch off period (Toff) to the switch on period (Ton) exceeds an upper threshold (Toff_high) within a predetermined time period or if the ratio of the switch off period (Toff) to the switch on period (Ton) is less than a lower threshold (Toff_low) within a predetermined time period.

16. The circuit of claim 9, wherein when the controller (24) is operable to identify that the input voltage (Vin) is a non-alternating voltage, and, in response thereto, to activate a device operable to reduce electrical interference.

17. An electronic driver for a lightsource comprising a power factor correction circuit of claim 9.

* * * * *